United States Patent [19]
Postema

[11] Patent Number: 5,623,996
[45] Date of Patent: Apr. 29, 1997

[54] AERATOR

[76] Inventor: Leonard F. Postema, 830 Ranchwood Trail, Woodstock, Ga. 30188

[21] Appl. No.: 508,322

[22] Filed: Jul. 27, 1995

Related U.S. Application Data

[63] Continuation-in-part of Ser. No. 252,244, Jun. 2, 1994.

[51] Int. Cl.$^6$ ............................ A01B 39/10; A01B 45/02
[52] U.S. Cl. .................. 172/118; 172/21; 172/42; 56/320.1
[58] Field of Search ............................ 172/21, 22, 239, 172/540, 541, 544, 551, 556, 662, 705, 710, 711, 76–78, 438, 247, 118, 42, 44; 56/256, 320.1, 320.2, DIG. 20, DIG. 24, 255, 295; 111/135, 137

[56] References Cited

U.S. PATENT DOCUMENTS

| | | |
|---|---|---|
| 160,489 | 3/1875 | Webster . |
| 1,186,375 | 6/1916 | Burrows . |
| 1,224,346 | 5/1917 | Wingquist . |
| 1,802,711 | 4/1931 | Fitts . |
| 1,840,552 | 1/1932 | Ackerman . |
| 2,244,099 | 6/1941 | Chase . |
| 2,314,035 | 3/1943 | Dontje . |
| 2,353,345 | 7/1944 | Lindskog . |
| 2,559,232 | 7/1951 | Simon . |
| 2,752,838 | 7/1956 | Rudio . |
| 2,759,310 | 8/1956 | Newkirk . |
| 2,813,389 | 11/1957 | Padrick . |
| 3,199,278 | 8/1965 | Dye . |
| 3,706,346 | 12/1972 | Vissers .................................. 172/102 |
| 3,747,687 | 7/1973 | Bodine ................................... 172/40 |
| 3,794,121 | 2/1974 | Drozak ................................... 172/21 |
| 3,796,028 | 3/1974 | Federspiel ............................. 56/15.2 |
| 3,799,079 | 3/1974 | Dietrich ................................. 111/137 |
| 3,993,143 | 11/1976 | Moreland, Jr. ........................ 172/22 |
| 4,020,907 | 5/1977 | Luck ...................................... 172/554 |
| 4,202,415 | 5/1980 | Barlage . |
| 4,425,972 | 1/1984 | Steinberg .............................. 172/551 |
| 4,750,441 | 6/1988 | Pfenninger et al. ................... 111/135 |
| 4,773,486 | 9/1988 | Huber et al. . |
| 4,776,404 | 10/1988 | Rogers et al. ....................... 172/21 |
| 4,802,536 | 2/1989 | O'Neal . |
| 4,883,371 | 11/1989 | Matsumoto . |
| 4,921,051 | 5/1990 | Annen ................................. 172/21 |
| 5,029,652 | 7/1991 | Whitfield . |
| 5,209,306 | 5/1993 | Whitfield . |

FOREIGN PATENT DOCUMENTS

| | | | |
|---|---|---|---|
| 651522 | 8/1964 | Belgium ............................ 172/21 |
| 934927 | 1/1981 | U.S.S.R. . |
| 1531869 | 12/1989 | U.S.S.R. ........................... 172/76 |

*Primary Examiner*—Terry Lee Melius
*Assistant Examiner*—Robert Pezzuto
*Attorney, Agent, or Firm*—Isaf, Vaughan & Kerr

[57] ABSTRACT

A compact lawn aerator comprises a rigid frame having a hitch for releasably fastening tire frame to the back of a self-propelled mower. An elongated axle is secured to the under side of the frame and a set of aerator wheels are rotatably mounted at spaced intervals along the axle. Each of the aerator wheels has a generally disk-shaped hub from the periphery of which four spikes radiate. Each spike initially projects from the hub along a radius but curves along its length in the direction of rotation of the wheel. The spikes are tapered to a sharpened point and their curve is determined so that, as the wheel rotates, the ends of the spikes pierce the soil at substantially right angles and the shank of the spikes slip into the ground progressively through the pierce point. This greatly reduces the force needed to drive the spikes into the ground, thus reducing the weight and size of the device. Further, as the spikes continue to rotate out of the soil, their curved shape functions as a cupped spade that tears and pulls a soil pug from the ground, leaving a loosely packed hole through which air can freely migrate into surrounding soil. The downward force imparted by the pulling out of the soil plug helps drive the successive plug into the ground, further significantly reducing the required weight of the device. In an alternate embodiment, independently suspended and independently castered single wheel aerator assemblies are hitched at spaced intervals along the back of a mower.

25 Claims, 8 Drawing Sheets

AERATOR

REFERENCE TO RELATED APPLICATION

This application is a continuation-in-part of U.S. patent application Ser. No. 08/252,244 filed Jun. 2, 1994.

TECHNICAL FIELD OF THE INVENTION

This invention relates generally to lawn care and more particularly to devices for aerating the soil of a lawn to cultivate thick and healthy grass.

BACKGROUND OF THE INVENTION

Modern lawns require a great deal of care and attention in order to nurture a thick green carpet of grass. Such care includes consistent mowing, watering, and thatching as well as periodic overseeding and fertilization. In addition, it is imperative that a healthy lawn be aerated at least twice a year and, preferably, even more often. Aeration usually entails creating a multitude of closely spaced small holes in the surface of the ground to permit air and oxygen to be absorbed into the soil. The holes also tend to increase moisture penetration into the soil and serve as receptacles for grass seed to prevent the seed from being washed away and to promote germination and growth.

Numerous lawn aeration devices have been available. One such device comprises a large cylindrical drum studded about its periphery with a plurality of short radially extending spikes. The drum is rolled or pulled over the ground and, as it rolls, the spikes are driven into the soil to create shallow holes. While this device is widely used and has proven somewhat successful, it is nevertheless plagued with numerous problems and shortcomings inherent in its design. For example, since the spikes necessarily engage the ground at an angle and are rotated laterally through the soil, significant force is required to penetrate the ground and move the spikes through the dirt. As a result, the drums of these devices generally are relatively large and usually are filled with water or sand or have weight racks to provide sufficient weight to drive the spikes into and through the soil. In addition, the density of spikes on the drum and thus the density of holes the aerator can make in the soil is severely limited since the weight of the device is inherently inadequate to drive more than a few of the spikes at a time into and through the soil. Finally, as each of the spikes of this device is forcibly driven into the soil, it pushes aside the dirt to make room for the spike. This is the action that actually creates the hole; however, it also necessarily compacts and hardens the soil all around the sides of hole. As a result, penetration of air from within the hole into surrounding soil is reduced as is the penetration of moisture. Consequently, the efficiency and advantages of the aeration are reduced.

Another lawn aeration device seeks to address the soil compaction problems of drum and spike aerators by providing hollow spikes that actually pierce the ground and remove a plug of soil to create a hole. During each penetration of the ground, another soil plug is forced upwardly through the hollow spike and the plugs are simply ejected from the spike at its upper extent. While these types of devices, commonly known as pluggers, tend to reduce the compaction of soil around the sides of the holes, they nevertheless do not eliminate it. This is because the soil must still be parted to accommodate the thickness of the walls of the hollow spikes as they pierce the soil. In addition, such hollow spike aerators still require significant force to drive them into and through the soil and thus still require large heavy and cumbersome structures for proper operation. This is because the sliding friction of the soil plug through the hole in the spike is relatively high requiring extra force to drive the plug through the soil. As a result of this extra force, the extracted plugs are usually highly compacted dowell-like plugs, which don't break up and disburse quickly.

Because of their weight, many lawn aerators are motorized. This not only makes them expensive but also renders them difficult to use. When the heavy spiked drums are driven over the ground by their motors, they naturally bump, bounce, and shake about as the spikes are driven into and through the soil. This can create significant fatigue for users of these aerators. Further, the unitary drum construction of these devices renders them very difficult to turn at the end of an aerating run and the drum often must be manually scraped about in an arc to achieve the turn. This is not only cumbersome, it also tends to destroy healthy grass already growing in the lawn and can create an unsightly mess, particularly in moist or wet soil. Slicer aerators having harrow-like discs that create a narrow furrow in the soil are also available. These devices, however, create narrow soil openings that tend to close up very quickly, especially when stepped upon.

Thus, there exists a need for a simple compact aerator that is light, small, and easily pulled or pushed manually across the ground. Such an aerator should require minimum force for piercing and aerating the soil, thus eliminating the need for heavy drums and the like. The spikes of the aerator should be designed to eliminate the compaction of soil common with prior art devices and, in fact, should insure that the soil is actually loosened in the vicinity of each hole to insure maximum aeration and moisture penetration. The device should be easy to use by the common homeowner, inexpensive to purchase, and sufficiently small, light, and easy to roll that it can be attached and pulled behind a standard walk behind lawn mower so that a lawn can be aerated as it is mowed. It is to the provision of such a lawn aerator that the present invention is primarily directed.

SUMMARY OF THE INVENTION

Briefly described, the present invention, in one preferred embodiment thereof, is an improved lawn aerator that is small, lightweight, and pullable behind a standard push or self walk behind mower to aerate a lawn as the lawn is mowed. The aerator comprises a frame having a tongue that can be attached to the back of a mower for pulling or can be attached to a handle for manual operation. An axle is mounted to the bottom of the frame and a set of aerator wheels are mounted at spaced intervals along the axle. Each of the aerator wheels has a disc-shaped hub from which a set of four curved spikes outwardly extend. The aerator wheels are oriented to roll across the ground. The spikes initially project from their hubs along a radius but have shanks that are curved generally in the direction of rotation of the wheels. Each of the spikes is tapered to a relatively sharpened ground piercing end.

In the ideal embodiment, the curve of each spike is critically determined to insure that the sharpened end of the spike engages and pierces the surface of the soil at a substantially right angle as the aerator wheel rolls across the ground. The curve further insures that, as the aerator wheel continues to roll, the shank of this flat knife-like blade or tine progressively follows the end of the tine into the soil through the opening initially formed by the sharpened end. Accordingly, as the aerator wheel rolls across the ground, each of its tines in turn pierces the soil like the tip end of a knife and slices cleanly through the pierce point until the tine is fully submerged in the soil, which occurs when the center of the wheel is aligned with the pierce point on the ground. Even though the prior art teaches a curved spike, these are heavy round spikes with at best a flattened end which requires considerable force to cause soil penetration and causes considerable compaction upon penetration. The flat knife-like tine of the present invention successfully overcomes these problems. Such a tine slips into the ground easily and penetrates to its maximum depth with a minimum of required force.

As the wheel continues to roll past the pierce point, the curved spike begins to be rotated back up out of the ground on the trailing side of the wheel. Since it is moving in the direction of its curve, the spike functions as a cup-shaped spade that loosens, pulls, and lifts a loose clump of soil from the ground leaving a small hole. The loose clump of soil removed from the hole is simply tossed aside on the surface leaving behind porous loose dirt on the walls of the hole. This loose dirt allows air and oxygen to penetrate freely through the walls of the hole and into the surrounding soil resulting in greatly improved oxygenization of the soil over prior art aerators, which, as discussed above, tend to leave holes with compacted soil sides. Further, the loose clump of soil deposited on the ground tends to break up and disburse much more quickly than the compacted plugs produced by many prior art aerators.

In addition to the forgoing advantages of easy penetration and the creation of porous hole sides that enhance aeration, the present invention also addresses the bulk and weight problems associated with prior art aerators. First, as discussed above, the curved knife-like tines are formed to insure that their sharpened ends pierce the ground for their entire length cleanly and easily and that their shanks slip into the soil substantially through the pierce point as the wheels rotate. This alone greatly reduces the force required to drive the spikes into the ground such that only a fraction of the weight required to drive in the spikes of prior art devices is needed. In addition to this, however, the spikes are positioned about their hubs so that one spike is being rotated out of the ground and, in the process, dislodging and pulling a plug of dirt from the soil as its immediately trailing spike is piercing and slipping into the soil. In this regard, by making the rotor hub small in diameter and positioning the tines ninety degrees apart, one tine is fully inserted and getting a good hook on the soil before the next successive tine begins to penetrate. This differs from prior art aerators, which typically include large diameter hubs or drums from which a plurality of spikes project. With such large hubs, the relatively shorter spikes do not rotate much in the soil and thus cannot get under and get a hook on the soil, as with the present invention. In the present invention, the dislodging and pulling of the soil by the trailing tine creates significant downward force on the hub. This force, in turn, is transferred to the piercing spike helping to drive it into the soil. It will thus be seen that the action of the spikes being extracted from the soil as the hubs roll provides a significant portion of the downward force needed to drive successive spikes into the soil. As a matter of fact, the device of this invention virtually grips and digs into the soil like the talons of a hawk under the influence of its own action. As a result, an even further significant reduction in weight needed to drive the spikes into the soil is realized.

The configuration and operation of the aeration wheels and spikes of this invention allows, for the first time, a practical lawn aerator that can be made small, light, and economical enough to become a common tool of the homeowner that can simply be hitched to a standard push or self-propelled walk behind mower and towed as a lawn is mowed. In such a configuration, the mower cuts the grass and the aerator follows behind to aerate the soil. A handle can also be attached as an alternative to towing for manual operation of the aerator alone. Numerous configurations of the invention are possible, including large commercial versions for golf courses and the like and small hand versions for aerating a flower bed or herb garden. All of these as well as other objects, features, and advantages of this invention will become more apparent upon review of the detailed description set forth below when taken in conjunction with the accompanying drawings, which are briefly described as follows.

DETAILED DESCRIPTION OF THE PREFERRED EMBODIMENTS

Figure 1:
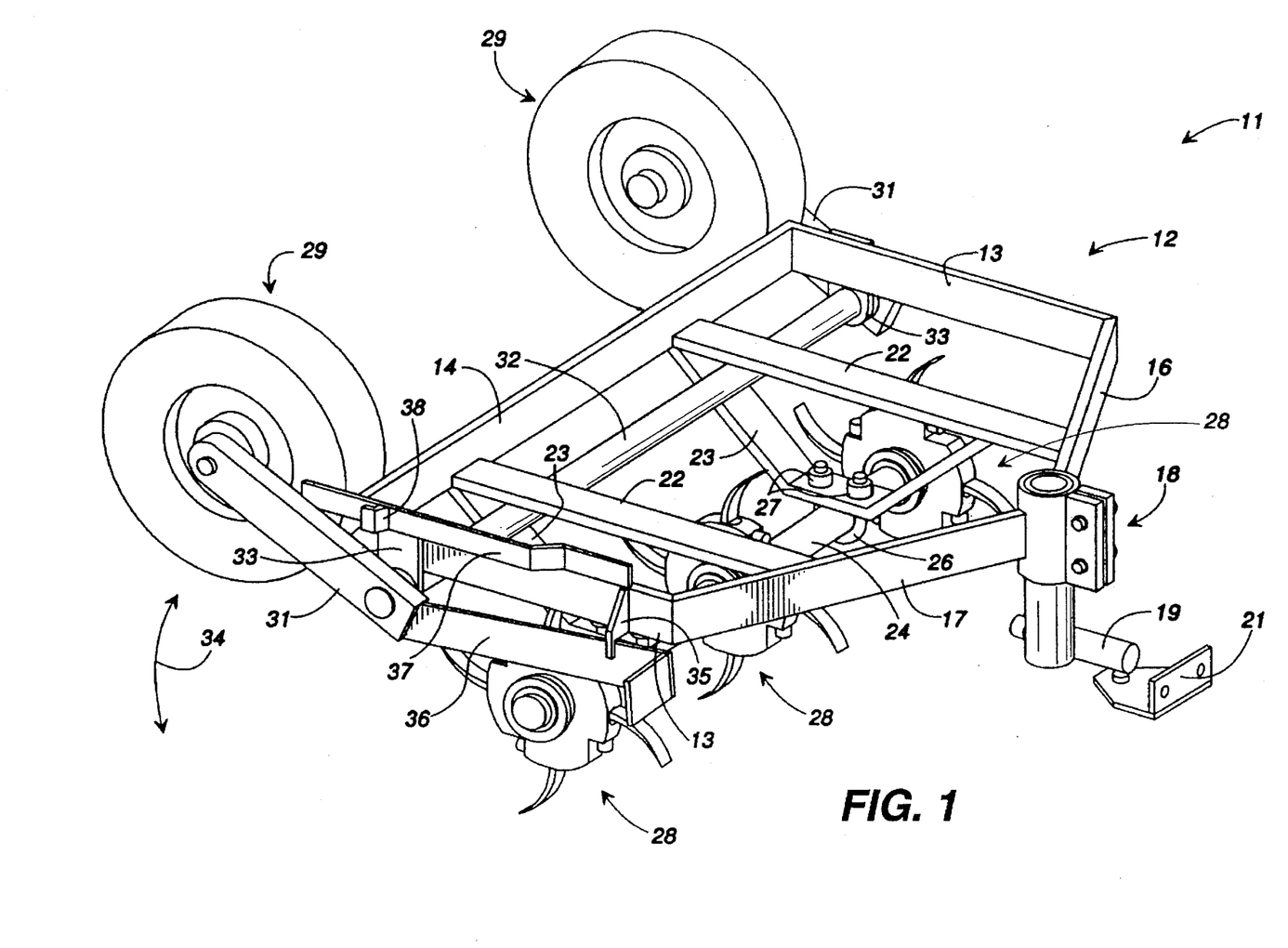
FIG. 1 is and overhead perspective view of a lawn aerator that embodies principles of the present invention in a preferred form.
Figure 2:
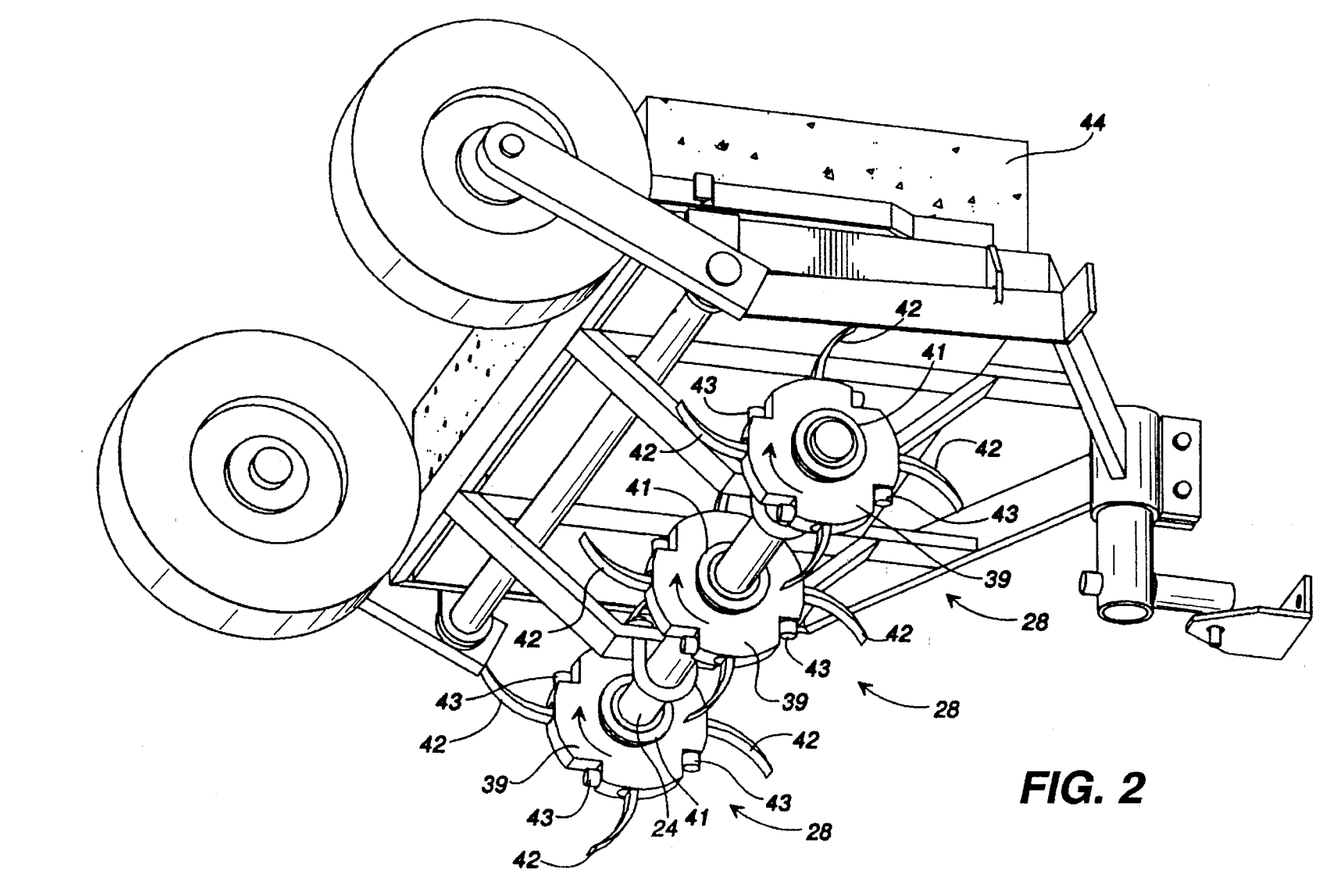
FIG. 2 is a perspective view of the lawn aerator of FIG. 1 as seen from the bottom side thereof and illustrating the spiked aerator wheels of the device.

Referring now in more detail to the drawings in which like numerals refer to like parts throughout the several views, FIGS. 1 and 2 illustrate a compact aerator that embodies principals of the present invention in one preferred form. The aerator 11 comprises a metal frame 12 formed of side bars 13, a back bar 14, and angled front bars 16 and 17. The front bars 16 and 17 terminate in a tongue assembly 18. The tongue assembly 18 includes a coupler 19 adapted to couple to a hitch 21. The hitch 21, in turn, is adapted to be mounted on the back panel of a standard or self-propelled walk behind mower, garden tractor, or other appropriate lawn vehicle for pulling the aerator of the present invention.

A pair of support bars 22 extend between the rear bar 14 and respective ones of the front bars 16 and 17 and are firmly welded or otherwise affixed thereto. A pair of axle mounting brackets 23 are fixed to the underside of the frame 12 and extend downwardly therefrom. More specifically, each of the brackets 23 is welded to the rear bar 14 at one end and is welded to a respective one of the support bars 22 adjacent the front portion of the frame 12. An elongated axle 24 is secured to the bottoms of the axle mounting brackets by a pair of U-bolts 26 and associated nuts 27. The axle 24 extends across the width of the frame 12 approximately in the center portion thereof. A set of aerator wheels 28 are rotatably mounted at spaced intervals along the length of the axle 24. The details of the aerator wheel construction and operation will be described in more detail herein below.

A pair of roller wheels 29 are each rotatably secured to the end of a pivot arm 31. The pivot arms 31 are welded or otherwise fixed to the ends of a pivot axle 32 that is rotatably journaled within a pair of spaced bearing brackets 33 that are fixed to the side bars 13. With this arrangement, the roller wheels 29 can be pivoted on their pivot arms 31 in the directions indicated by arrow 34 between a raised position as shown in FIGS. 1 and 2 and a lowered position (not shown) wherein the pivot arms 31 extend downwardly from the frame. This last position of the wheels 29 provides for easy transportation of the aerator 11 to and from storage sites and to and from areas that are to be aerated. A handle 36 is fixed to one of the pivot bars 31 for manually raising and lowering the roller wheels 29. A latch 35 is provided on the frame 12 for locking the handle 36 in its down position and thus locking the wheels 29 in their up positions. Similarly, a spring bar 37 and associated latch 38 are provided for releasably locking the handle 36 in its up position and thus the wheels in their down positions.

As best seen in FIG. 2, each of the aerator assembly 28 comprises a generally disc-shaped central hub 39 that is rotatably journaled on the axle 24 by means of appropriate bearings 41. Extending outwardly from each of the hubs 39 is a set of four aerator spikes 42, which actually pierce and penetrate the ground to achieve aeration. A set of four equally spaced radial holes is drilled through the edge of each hub 39 and one of the spikes 42 is releasably secured in each hole by means of a corresponding set screw 43.

Each of the aerator spikes 42 initially extends from its hub 39 along a radius thereof but immediately begins to curve generally in the direction of rotation of the hub. In addition, each of the spikes is tapered to a relatively sharp point at its free end. As discussed in more detail below, in the ideal embodiment the curve of each spike 42 is critically determined so that as the aerator rotor assemblies 28 rotate in the directions indicated in FIG. 2, each spike pierces the ground at its sharpened end whereupon the shank of the spike progressively follows the end into the ground through the initial pierce point. This configuration greatly reduces the force needed to drive the spikes into the ground and thus reduces significantly the size, bulk, and weight of the aeration device. As a matter of fact, it has been found that a common four inch construction block 44 (FIG. 2) nestled within the cradle formed by the frame and its support bars provides more than sufficient weight to drive the spikes of all three aerator wheels cleanly and smoothly into the ground.

FIGS. 3A–3F illustrate the sequential operation of each aerator rotor assembly as it rolls across the surface of the ground. In these illustrations, the rotor assembly are seen to be rolling across the ground in the direction of arrows 46 and rotating in the direction of arrows 47. Throughout these illustrations, dashed line 48 is positioned at a fixed point on the ground to illustrate relative motions of the components of the rotor assembly. In addition, the designations I, J, and K indicate three of the aerator spikes on the rotor assembly as it moves across the ground.

Figure 3A:
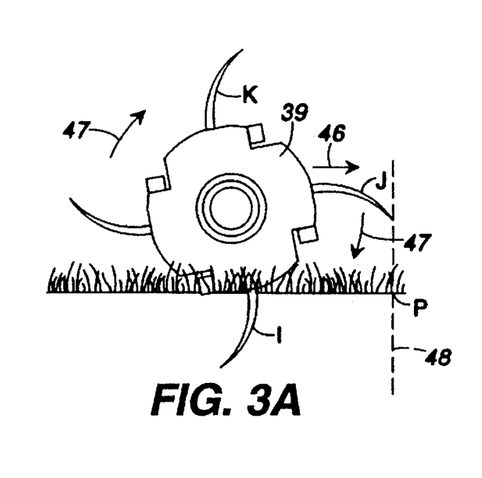
FIGS. 3A–3F show sequentially the operation of the wheels and curved aerator spikes of the present invention as the device is pulled or pushed across the ground.
Figure 3B:
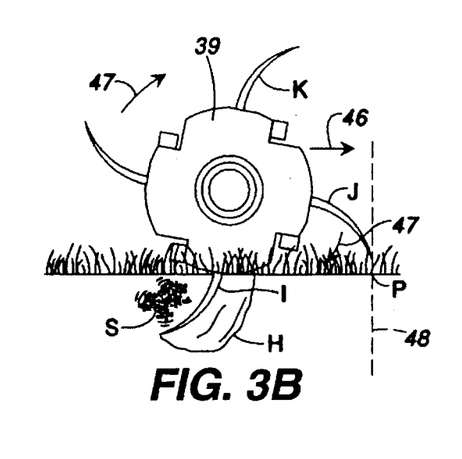

In FIG. 3A, aerator spike I is seen to be inserted substantially fully into the ground beneath the rolling hub 39. The tip of aerator spike J is poised above the ground in position for penetration at point P. In FIG. 3B, the hub 39 has rotated in the direction 47 and translated across the ground in direction 46 until the point of aerator spike J has engaged the ground at point P. At the same time, aerator spike I has begun to be rotated up behind the hub 39 and out of the ground. As spike I moves in this fashion, its curved shape functions as a spade that begins to dig and pull a clump of soil S from the ground. In its wake, the aerator spike I begins to leave a hole H in the ground. It will be understood that since the aerator spike I is shoveling the clump of dirt S from the hole H and moving it up out of the hole, the sides of the holes will naturally be comprised of loose dirt and soil from which the clump S has been broken and pulled away.

Figure 3C:
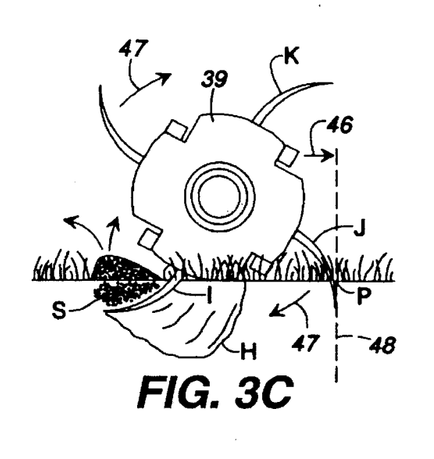

In FIG. 3C, the hub 39 has been rotated a bit further. It is seen from this figure that the sharpened tip of the aerator spike J has pierced the surface of the ground at point P and is being driven by the motion of the aerator wheel deeper into the soil. The curve of spike J, and all of the spikes for that matter, is predetermined so that as the hub 39 moves in direction 46 across the ground, the shank of spike J progressively slips into the ground through the original puncture point P made by the tip of the spike. Thus, the spike is not moved laterally across its length through the soil as with spikes on prior art devices but rather is slipped slowly and cleanly into the ground in a fashion reminiscent of a knife being stuck into the soil. This configuration of the spikes and their resulting functionality reduces by a great amount the force required to drive the spike J into the soil. In fact, this force has been found to be very small indeed when the spikes are appropriately sharpened and the ground is of average compaction.

Figure 3D:
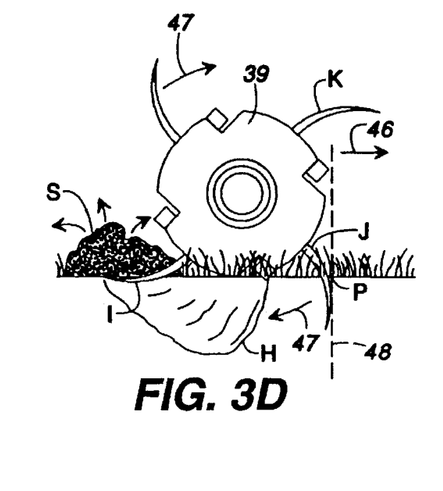

At the same time that spike J is being driven progressively into the ground through point P, spike I which previously was driven into the ground, begins to move further out of the ground shoveling the small clump of soil S along with it as it goes. As the spike I shovels out the clump of soil S, a corresponding downward force equal to the force required to break out the clump of soil, pull and break away any roots, and extract the clump from the ground is imparted to the hub 39. This force, in turn, is transferred to the entering spike J. As a result, the shoveling action of spike I actually provides some of the downward force necessary to drive the next succeeding spike J into the ground behind spike I. In practice, it has been found that this shoveling action indeed provides a significant fraction of the necessary force for driving successive spikes into the ground. In fact, as the device of this invention is pushed or pulled across the ground, its spikes tend to grab and grip the ground like the talons of a hawk and hug the ground closely as the device is moved across the surface. In FIG. 3C, the clump of soil S is beginning to be dislodged and broken away from the soil and is being carried above the surface of the ground.

in FIG. 3D, the hub 39 has rotated a bit further and the aerator wheel has moved laterally in the direction 46. The aerator spike J has slipped further into the ground through puncture point P and aerator spike I has almost been completely extracted from the ground, carrying with it the loose clump of soil S and leaving behind it the ragged hole H.

Figure 3E:
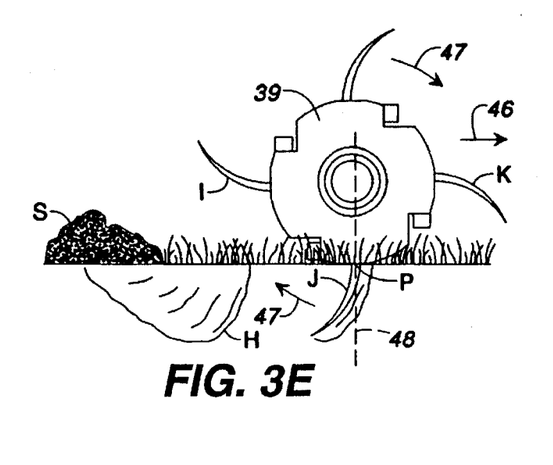

In FIG. 3E, spike I has been rotated completely out of the ground and the center of the hub 39 is aligned over the puncture point P on the ground. At this point, the spike J is completely inserted into the ground beneath the hub 39 and is just beginning to be rotated up out of the ground behind the moving hub. In the meantime, the prior action of spike I has left a hole H in the ground and the loose clump of soil S that was removed from the hole has been laid atop the ground. It can be seen that the aerator of this invention allows for closely spaced aeration holes, which are highly desirable for proper soil aeration.

Figure 3F:
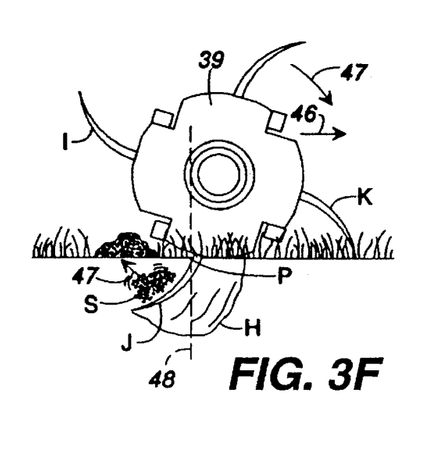

In FIG. 3F, the hub 39 has been moved across the ground in direction 46 until spike K has engaged the surface of the ground and is beginning to be pushed into the soil. Spike J is now moving up around behind the hub 39, bringing with it a clump of soil S and leaving behind it a hole H as did spike I in the previous cycle. Thus, in FIGS. 3A–3F, the aerator wheel is shown to complete a cycle and begin another cycle. It will be appreciated that as the aerator rotor assembly moves across the ground, it leaves behind it a series of spaced rough-edged holes from which dirt has been removed and deposited onto the ground.

Figure 4:
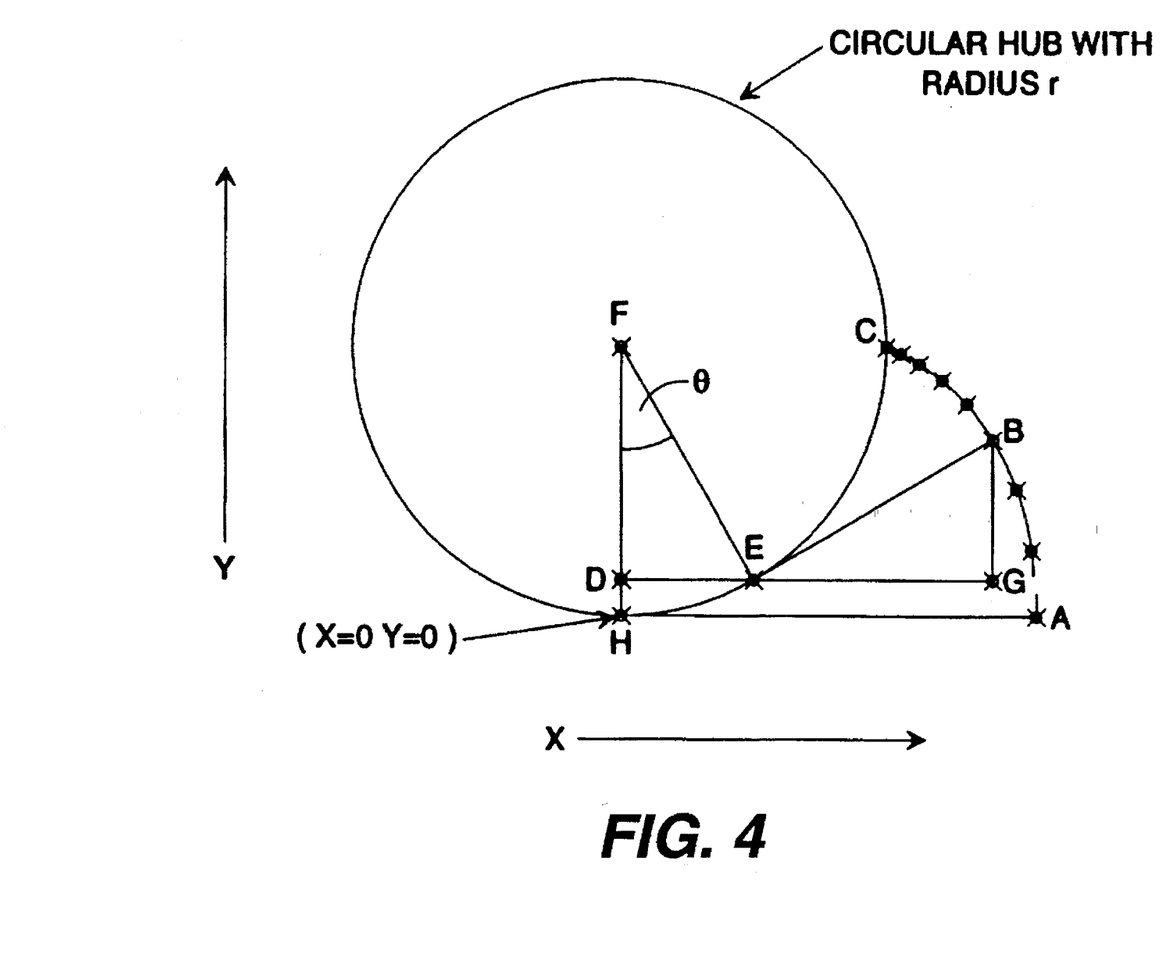
FIG. 4 illustrates the empirical determination of the spike shape for the ideal embodiment thereof.

The ideal curve of the spikes as illustrated in FIGS. 3A through 3F can be determined empirically through the following mathematical solution. The solution yields a formula to determine the X and Y coordinates of a point B, which lies along the inside edge of a curved spike meeting the conditions described above. The point B is the point on the spike that enters the ground through point A when the hub is rolled through a corresponding arbitrary angle θ in the x direction. In the cartesian coordinate system in which the solution is presented, the X axis is horizontal, the Y axis is vertical, and the point X=0, Y=0 coincides with point H directly below the center of a circular hub. Point C has coordinates X=r, Y=r when the hub is in its initial position as shown in FIG. 4, where r is the radius of the hub.

From geometry and trigonometry, we know that the following relationships are true:

$$EH = \frac{\pi r \theta}{180}$$

$$CH = \frac{\pi r}{2}$$

$ED = r\sin\theta$
$EB = AH - EH$
$EG = \cos(\theta) \times EB$
$BG = \sin(\theta) \times EB$
and
$DH = FH - (\cos(\theta) \times FH)$ We also know that the X and Y coordinates of point B are:

$X=EG+ED$ $Y=BG+DH$

By substitution, we have the following final equations:

$$X = \left( \cos(\theta) \times \left( \frac{\pi r}{2} - \left( \frac{\pi r \theta}{180} \right) \right) \right) + (\sin(\theta) \times FH)$$

$$Y = \left( \sin(\theta) \times \left( \frac{\pi r}{2} - \left( \frac{\pi r \theta}{180} \right) \right) \right) + (FH - (\cos(\theta) \times FH))$$

In order to determine a set of X,Y points that define the desired curve, one need only select a radius r for the hub and solve the above equations for a plurality of θ's between 0 and 180 degrees. The result is a set of points B that define the curve AC depicted in FIG. 4.

The invention has thus far been described in terms of the ideal shape of the spikes to insure that each spike pierces the ground normal to its surface and slices into the soil through a single point. While this configuration has indeed been found to be ideal and preferred for aerator hubs that are driven to pull them across the ground, a slightly modified variant is preferred for an aerator that is pulled or pushed across the ground. In this later situation, the spikes can tend to ride up and walk over the surface of the ground, particularly in dense or hard soil. In addition, the ideal spike as determined from the above equations inherently limits the depth to which the spike can penetrate for a hub of a given radius.

To address these problems for pushed or pulled aerators, it has been found advantageous to rotate the curved spikes slightly outwardly from their ideal positions. With this modification, the spikes extend further outwardly from the hub and thus can penetrate the ground further to create deeper aeration holes. In addition, the modified spikes do not pierce the ground vertically but rather at a slight acute angle. This configuration in conjunction with the forwardly and downwardly directed composite force imparted by the vector sum of gravity and the pulling force eases penetration and prevents the spikes from "walking" on top of the ground. An additional advantage is that the modified spikes do not slice into the soil through precisely one point but rather tend to pierce at a point and then move slightly rearwardly toward the hub as the hub rolls. This insures that there is no compacting of the soil in front of the path of the spike and thus insures that the resulting aeration hole has loose dirt sides all around for maximum aeration.

Accordingly, the present invention should not be interpreted as being limited by the illustrated embodiments exhibiting the ideal shaped spike. Rather, the invention contemplates and encompasses the above described and other variations of the ideal embodiment with the ideal spike shape representing only a preferred starting place.

Figure 5:
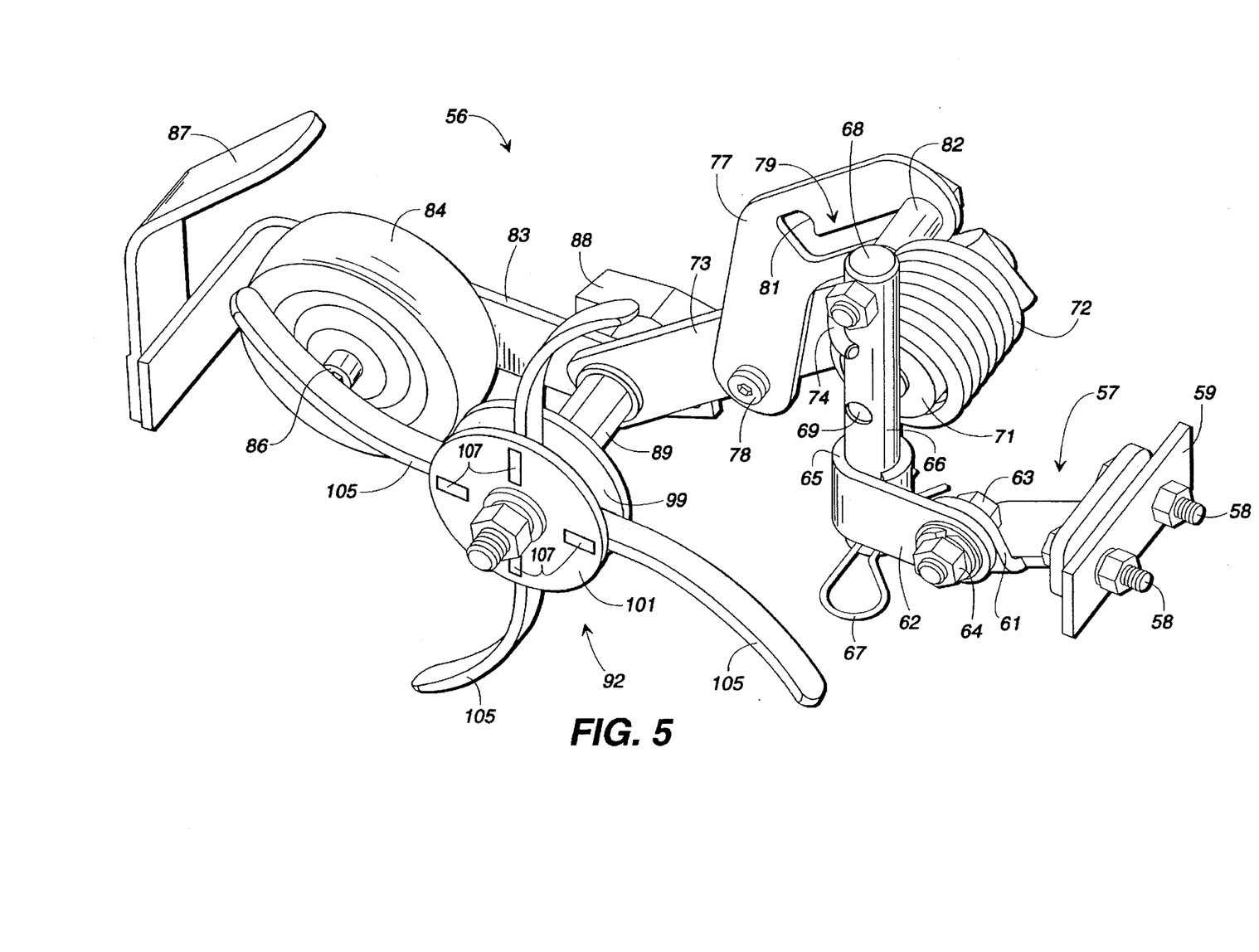
FIG. 5 is an overhead perspective view of a lawn aerator that embodies principals of the present invention in an alternate preferred embodiment.
Figure 6:
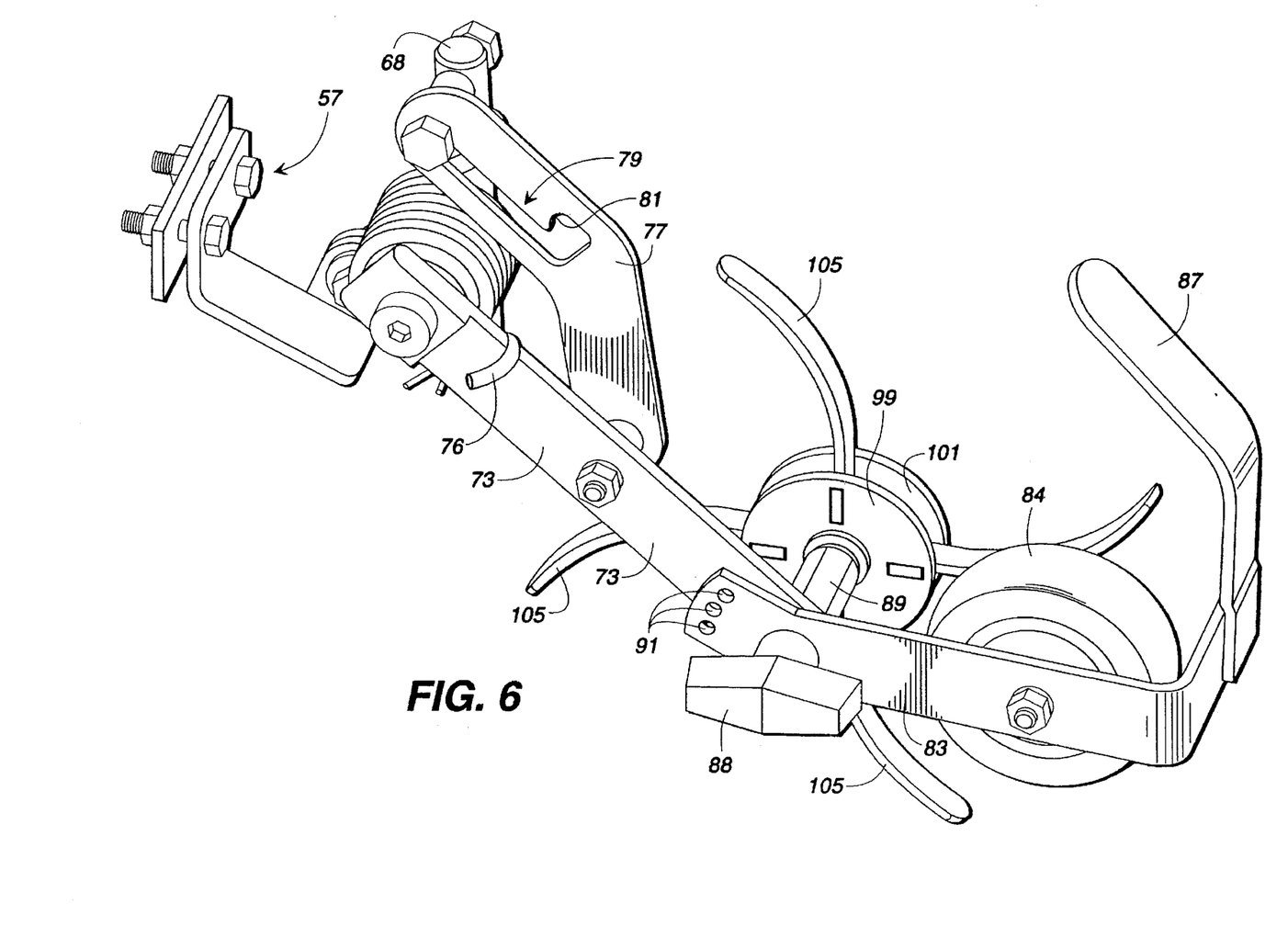
FIG. 6 is a perspective view of an aerator assembly that embodies principles of the present invention in another preferred form.
Figure 7:
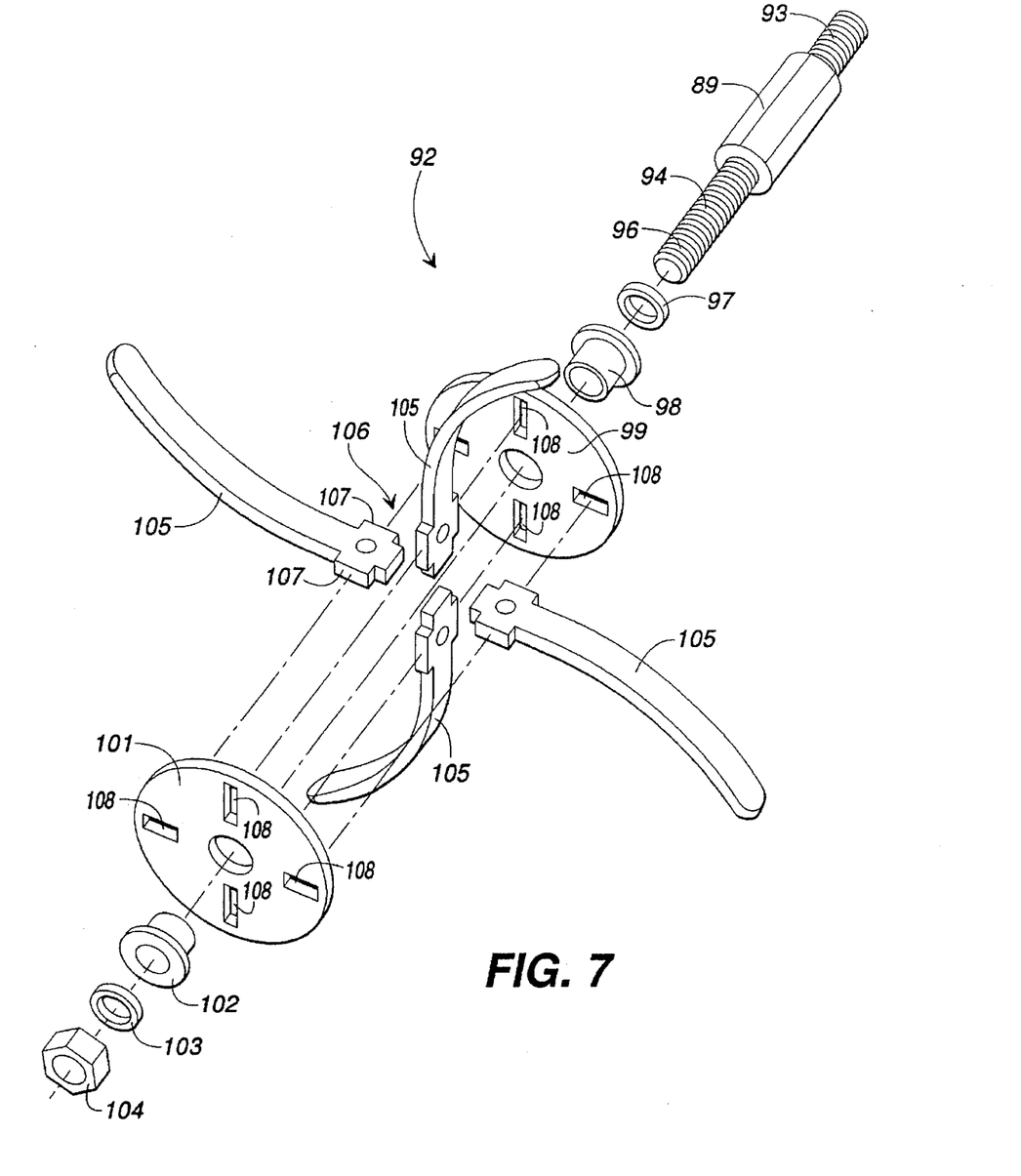
FIG. 7 is an exploded view of an aerator wheel assembly showing principles of this invention.

FIGS. 5–7 illustrate a soil aerator that embodies principals of the present invention in an alternate form. In this alternate embodiment, an aerator assembly 56 is adapted to be mounted to the rear panel of a standard push or self propelled mower for aerating the lawn as the grass is mowed. In use, for example, one to three or more of the assemblies 56 are attached at spaced intervals along the back of the mower to provide an aeration swath that is approximately the same width as the mower.

The assembly 56 comprises a mounting bracket 57 adapted to be secured to the substantially vertical back panel of a lawn mower deck. The mounting bracket 57 has a pair of bolts 58 that extend through holes that are drilled for the purpose in the back panel and through aligned holes in a reinforcing plate 59 mounted inside the mower back panel. Obviously, many types of brackets may be used to mount the assembly to the mower and the illustrated bracket 57 is only one preferred alternative.

The mounting bracket 57 includes an upturned tang 61 to which a caster hitch 62 is securely fastened by means of a bolt 63 and nut 64. The distal end of the caster hitch 62 is bent to form a vertically oriented annular caster sleeve 65. A caster pin 66 is rotatably journaled within the caster sleeve 65 and is removably secured therein by a cotter pin 67. The caster pin 66 extends upwardly from the caster sleeve to a top end portion 68.

A mounting lug 69, which can be a shoulder bolt, is secured to the caster pin intermediate its ends and extends transversely with respect thereto. A cylindrical spacer 71 is mounted about the mounting lug 69 and a torsion spring 72 is mounted about the spacer. An elongated pivot bar 73 has first and second ends and is pivotally mounted at its first end to the free end of the mounting lug 69 between the head of the lug and the end of the spacer 71. The torsion spring 72 has a first hooked end 74 that bears against the caster pin 66 and a second hooked end 76 (FIG. 6) that bears against the elongated pivot bar 73. In this way, the pivot bar 73 is spring biased toward a downwardly rotated orientation as depicted in FIGS. 5 and 6 by the force provided by the torsion spring 72.

A crooked latch bar 77 is pivotally secured at its lower end to the pivot bar 73 by means of a shoulder bolt 78. The upper end portion of the latch bar 77 is formed with a slot 79 that defines a keyway with a latching notch 81 at its lower end.

A bolt and spacer assembly 82 extends transversely from the caster pin 66 at its top end 68 and the distal end of the bolt and spacer assembly 82 is slidably mounted within the keyway formed by the slot 79. With this configuration of the latch bar assembly, it will be seen that the latch bar serves to limit the spring biased downward rotation of the pivot bar 73 to a lowered position wherein the bolt and spacer assembly 82 is nestled within the top end of the slot 79. As the pivot bar 73 is moved upwardly against the bias of the spring 72, the bolt and spacer assembly 82 slides downwardly within the slot 79. Thus, pivotal motion of the pivot bar 73 is accommodated. However, when the pivot bar 73 is pivoted all the way up, the latching notch 81 drops down over the bolt 82, thus releasably latching the pivot bar 73 in an upwardly extending raised orientation. Through this latching function, the entire assembly can be releasably latched in a raised position when it is not in use, as described in more detail below. When it is desired to lower the pivot bar 73, upward force is applied to the assembly and the latch bar 77 is manually raised to move the bolt and spacer 82 back into the elongated portion of the slot 79. The assembly can then be lowered for normal operation.

An L shaped wheel bar 83 is secured at the end of one of its legs to the lower or second end portion of the pivot bar 73 and extends rearwardly therefrom. A wheel 84 is rotatably mounted on an axle 86 that is in turn secured to the wheel bar 83. A guard plate 87 is welded or otherwise secured to the end of the short leg of the wheel bar 83 and extends upwardly and thence forwardly therefrom. The guard plate 87 functions to protect the feet of a user from the moving elements of the assembly during use and manipulation of the aerator assembly as described in more detail below.

As best illustrated in FIG. 6, the wheel bar 83 is mounted on the second end of the pivot bar 73 by means of a threaded knob 88 secured on the threaded end of an axle assembly 89, which extends through appropriate through bores in the end portions of the wheel bar 83 and pivot bar 73. The end of the wheel bar 83 beyond the through bore is provided with adjustment holes 91 that receive a small dimple formed and appropriately located on the pivot bar 73. In this way, the wheel bar 83 can be positioned in three distinct angular orientations with respect to the pivot bar, corresponding to the dimple in one of the three holes 91, to position the wheel 84 at a desired height relative to the aerator wheel. The purpose of this adjustment is to limit or define the penetration depth of the aerator tines as detailed below.

As best illustrated in FIGS. 5 and 7, an aerator rotor assembly 92 is rotatably secured to the free end of the axle bar 89. The axle bar 89 has a first threaded end 93 to which the threaded knob 88 is attached to mount the wheel bar 83 to the pivot bar 73 as described above. The intermediate portion of the axle bar 89 is hexagonal in shape so that it can be grasped with a wrench. The other or free end of the axle bar 89 is cylindrical and forms an axle 94 having a threaded end 96.

Sequentially mounted on axle 94 and, in combination, forming the aerator rotor assembly 92 is a first rubber O-ring 97, a first hub bearing 98, a first and second disc shaped hubs 99 and 101, a second hub bearing and O-ring 102 and 103, and a locking nut 104. A set of four curved tines 105 are captured and held between the disc shaped hubs 99 and 101, as best illustrated in FIG. 5. More specifically, each of the tines is formed with a mounting end 106 that forms a pair of laterally extending opposed keys 107. When the elements 97–104 are received onto the axle 94, the mounting ends 106 of the tines 105 are aligned becoming captured between the disc shaped hubs 99 and 101 with their corresponding keys 107 extending into aligned slots 108 formed in the disc shaped hubs 99 and 101. The tines 105 thus become firmly but releasably mounted between the hubs for use and operation without the requirement for welding or other complicated attachment means. If one of the tines becomes damaged, it is easily replaced by removing the elements of the aerator wheel assembly from the shaft, replacing the damaged tine or tines with new ones and reassembling the assembly. In addition, the aerator assembly 92 of this invention is lightweight, reliable, and economical to produce.

In use, one to three or more, usually two, of the soil aerator assemblies of this embodiment are mounted by means of their mounting brackets 57 to the vertical back panel of a lawn mower deck. The assemblies are mounted in spaced relationship along the back of the mower deck so that each of the assemblies is spaced a few inches from its neighbors. For cutting grass without aeration, each of the assemblies is raised and locked in place in its raised position by means of the slotted latch bar 77, or removed by pulling out the cotter pin 67 and lifting the unit off. When the mower is in the proper position on a lawn and it is desired to aerate the lawn, each of the assemblies is lowered by lifting up on the wheel bar 83 to disengage the bolt and spacer assembly from the latching notch 81. The entire assembly is then lowered until the tines of the aerator wheel engage the ground. The threaded knob 88 may also be loosened if desired and the wheel bar 83 adjusted to position the rotor 84 relative to the aerator wheel assembly 92 to gauge the depth to which the tines 105 will penetrate the ground.

With each of the aerator assemblies adjusted and lowered, the user simply guides the mower across the lawn in the normal way to cut the grass. As the mower moves, the aerator assemblies are pulled behind the mower with the tines penetrating and pulling out loose clumps of dirt to aerate the soil as described in extensive detail hereinabove. The depth of aeration is limited by the vertical position of the wheel 84. Since each of the aerator assemblies is independently castered, they are each free to follow their natural arc as the mower is turned and moved about the lawn. In addition, the floating independent suspension provided by the torsion spring 72 imparts the weight of the mower through the spring to the tines to aid their penetration into the ground. As described above, once the tines begin to aerate the ground, they tend to grab the soil like the talons of an eagle. This action in conjunction with the transfer of mower weight through the torsion spring 72 is more than sufficient to drive the aerator rotor assemblies through the soil.

The independent spring biased suspension also ensures that if a tine of rotor assemblies strikes an obstacle such as a rock, the assembly simply raises up against the bias of the spring until the obstacle is cleared. In such an instance, only one of the aerator assemblies is affected and the other assemblies continue to aerate the ground on either side of the obstacle. Further, in instances where obstacles are struck by one of the tines, the independent suspension ensures that the affected tine bears only the weight provided through the torsion spring 72 and not the substantially greater weight imparted by prior art aerators to drive multiplies tines through the soil. This protects the tines against breakage as a result of obstacles in the soil. Thus, it will be seen that the independent suspension and independent mounting of the aerator assemblies provides numerous advantages over prior art aerators. One additional advantage is that operation of the assemblies is smooth since each assembly is independently spring loaded and suspended. Thus the jerky or bumpy characteristics of prior art aerator machines is avoided.

With the just described mechanisms, it has been found that effective and efficient aeration can be accomplished with a mechanism that is substantially smaller and many times lighter than prior art aeration devices. In addition, the apparatus of this invention can be made inexpensively so that the average home owner can afford one and use it periodically to aerate his lawn. When not in use, the apparatus of the first embodiment is light enough simply to be hung on a wall. In the second illustrated embodiment, each of the independent assemblies are simply raised and latched in place when not in use. Alternatively, each can be removed from the mower altogether by pulling the cotter pin 67 and removing the caster pin from the caster sleeve. During use, the invention can be hitched to the back panel of a standard walk behind mower, riding mower, or other lawn implement and pulled along behind. As an additional advantage, the present invention provides aeration holes that are superior to those provided by prior art devices. This is because the dirt is pulled out of the holes rather than compacted against the sides of the holes. As a result, the sides of the holes comprise loose dirt through which moisture and oxygen can freely migrate into surrounding soil. Thus, the present invention represents a significant advance in the lawn-care art in a number of critical aspects.

Figure 8:
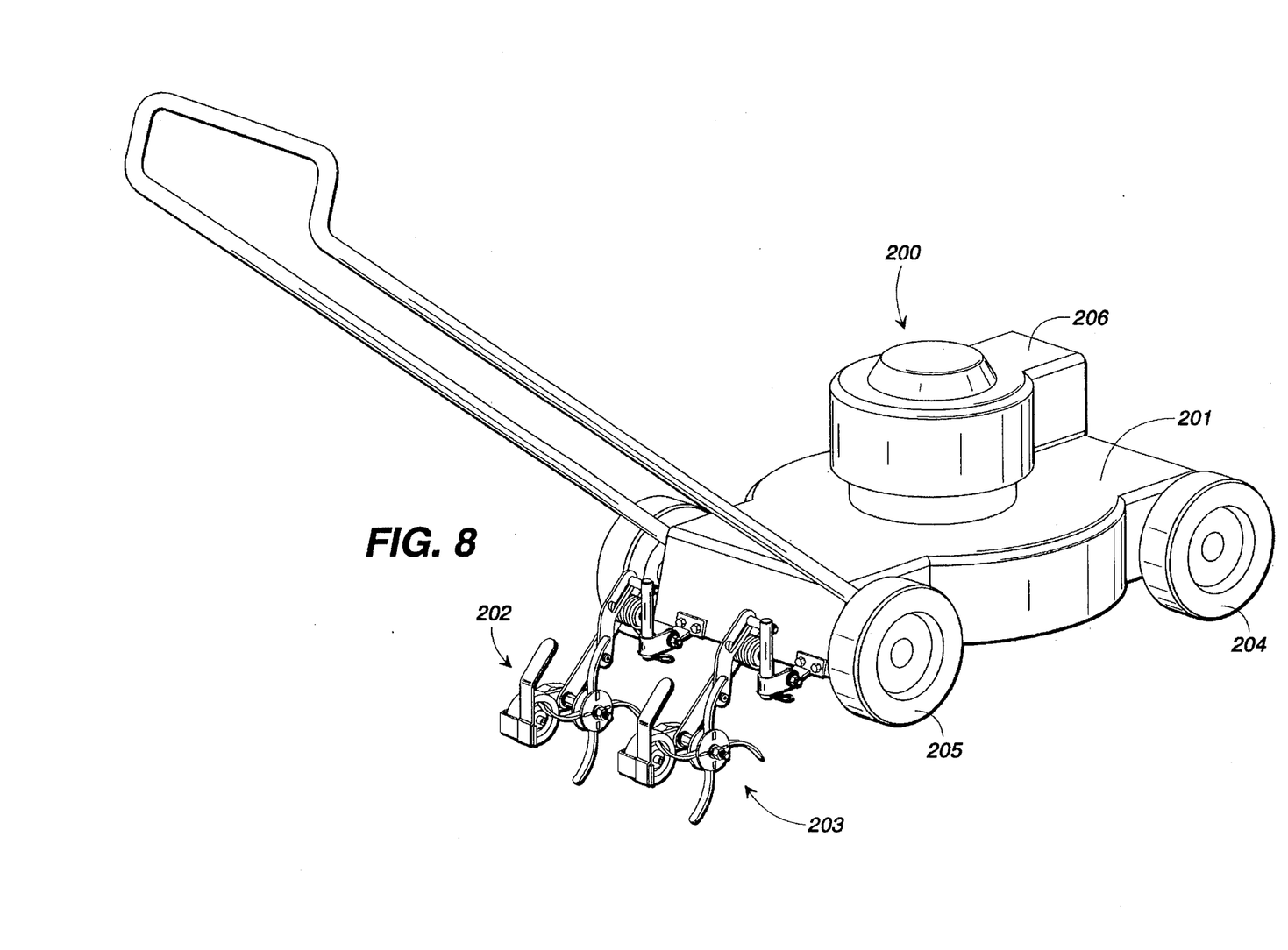
FIG. 8 shows an aerating lawn mower with the aerating assemblies of the present invention attached to the deck of the mower.

FIG. 8 illustrates the present invention in the form of an improved aerating lawn mower. The lawn mower comprises a deck 201 to which wheels 204 and 205 are attached for moving the mower across the ground. A motor 206 is provided for spinning the blade of the mower for cutting grass and, in some cases, for propelling the mower. A pair of aerator assemblies 202 and 203 are configured according to the present invention. Each assembly is mounted to the deck of the mower on the back thereof so that they are pulled behind the mower as the mower is propelled or pushed across the ground.

The invention has been described herein in terms of preferred embodiments and methodologies. It will be obvious to those of skill in this art, however, that various modifications might well be made to the illustrated embodiments within the scope of the invention. For example, even though four tines are preferred, fewer or more than four might also be employed. In addition, the aerator rotor assemblies themselves might well be simply molded from a single piece of metal rather than formed of a hub with detachable spikes. The invention has been illustrated in terms of a multi-wheel pull-along devices for use with lawn mowers. However, single wheel, hand-held aerators for use with small flower gardens or herb gardens might also be employed within the scope of this invention. On the other side of the spectrum, large commercial versions of the aerator might also be produced to aerate golf courses, farms, and other large plots of land. These and many other possible additions, deletions, and modifications are possible and may be made to the illustrated embodiments without departing from the spirit and scope of this invention as set forth in the claims.

I claim:

1. An aerator assembly comprising a frame member, an elongated pivot bar having a first end and a second end, said pivot bar being mounted at its first end to said frame member for pivotal movement about a substantially horizontal axis between a lowered position of said pivot bar and a raised position of said pivot bar, biasing means on said assembly for yieldably biasing said pivot bar toward its lowered position, aerating means mounted to said pivot bar for aerating soil as said aerator assembly is moved across the ground, and means on said assembly for providing castering movement of said pivot bar.

2. An aerator assembly as claimed in claim 1 and wherein sad biasing means comprises a torsion spring.

3. An aerator assembly as claimed in claim 1 and wherein said aerating means comprises a rotatable hub mounted to said pivot bar and a set of tines projecting from said hub for successively piercing the ground as the assembly is moved across the soil.

4. An aerator assembly as claimed in claim 3 and wherein four tines project from said hub.

5. An aerator assembly as claimed in claim 3 and wherein each of said tines is curved in the direction of hub rotation to pierce and slip into the ground as said assembly is moved across the ground.

6. An aerator assembly as claimed in claim 3 and further comprising means on said assembly for limiting the penetration of said tines into the soil to limit the depth of aeration as said assembly is moved across the ground.

7. An aerator assembly as claimed in claim 6 and wherein said means for limiting the penetration of said tines comprises a wheel mounted to said assembly with said wheel being vertically positioned to ride on the surface of the ground a predetermined distance from the lower extent of said tines to limit the penetration of said tines into the soil.

8. Art aerator assembly as claimed in claim 7 and wherein the position of said wheel is vertically adjustable for selectively adjusting the penetration of said tines.

9. An aerator assembly as claimed in claim 1 and further comprising stop means for limiting the downward pivotal motion of said pivot bar.

10. An aerator assembly as claimed in claim 9 and further comprising latch means for releasably latching said pivot bar in its raised position.

11. An aerator assembly as claimed in claim 10 and wherein said stop means and said latch means is formed by a latch bar pivotably attached at one end to said pivot bar intermediate its first and second ends, said latch bar being formed with a slot and latching notch and means on said frame member extending through said slot for sliding movement along the slot as said pivot bar is raised and lowered and for engagement with the latching notch when said pivot bar is moved completely to its raised pivoted orientation.

12. An aerator assembly for attachment to the deck of a mower for aerating the soil as the mower moves across the ground, said aerator assembly comprising an aerator rotor assembly having a rotatable hub with a set of tines extending outwardly therefrom for piercing and aerating the soil as said assembly is moved across the ground, mounting means for mounting said aerator rotor assembly to the deck of a mower for selective movement between a lowered position wherein said tines engage and pierce the soil as the mower is moved across the ground and a raised position wherein said tines are displaced from the ground, and biasing means on said aerator assembly for yieldably biasing said aerator rotor assembly toward its lowered position with sufficient force to insure penetration of the tines into the soil while allowing the aerator rotor assembly to move against the bias of the biasing means toward its raised position in the event a tine encounters an obstacle in the soil.

13. An aerator assembly as claimed in claim 12 and wherein said biasing means comprises a torsion spring.

14. An aerator assembly as claimed in claim 12 and wherein said mounting means comprises a hitch assembly for hitching said aerator assembly to the back of a mower and an elongated pivot arm having a first end and a second end, said aerator rotor assembly being rotatably mounted to said second end of said pivot arm with said first end of said pivot arm being mounted to said hitch assembly for pivotal movement between a first pivotal orientation wherein said aerator wheel in its lowered position and a second pivotal orientation wherein said aerator wheel is in its raised position, said biasing means being configured to bias said pivot arm toward its first pivotal orientation.

15. An aerator assembly as claimed in claim 14 and wherein said biasing means comprises a torsion spring coupled between said hitch assembly and said pivot arm for spring biasing said pivot arm toward its first pivotal orientation.

16. An aerator assembly as claimed in claim 14 and further comprising means on said aerator assembly for limiting the depth of penetration of said tines into the soil as said assembly is moved across the ground.

17. An aerator assembly as claimed in claim 16 and wherein said means for limiting the depth of penetration comprises a wheel mounted on said aerator assembly and positioned to ride upon the surface of the ground at a selected location above the lower extent of said tines.

18. An aerator assembly as claimed in claim 17 and wherein said wheel is vertically adjustably mounted to said aerator assembly for selectively adjusting the depth of penetration of said tines.

19. An aerator assembly as claimed in claim 12 and wherein said mounting means includes means for mounting said aerator assembly to the deck of a mower for castered motion of said assembly as the mower turns corners and is otherwise manipulated across the ground.

20. An improved aerating lawn mower comprising a mower deck with a back surface, an engine, grass cutting means, and at least one aerator assembly hitched to said back surface of said mower deck for aerating the soil as said mower moves across the ground, said aerator assembly including an aerator rotor having a rotatable hub with a set of tines extending outwardly therefrom for piercing and aerating the soil as said assembly is moved across the ground behind said lawn mower, mounting means for mounting said aerator rotor assembly to said back surface of said mower deck for selective movement of said aerator rotor assembly between a lowered position wherein said tines engage and pierce the soil as the mower is moved across the ground and a raised position wherein said tines are displaced from the ground, and biasing means on said aerator assembly for yieldably biasing said aerator wheel toward its lowered position with sufficient force to insure penetration of the tines into the soil while allowing the aerator wheel to move against the bias of the biasing means toward its raised position in the event a tine encounters an obstacle in the soil.

21. An aerator assembly as claimed in claim 1 and wherein said means for providing castering movement of said pivot bar comprises a caster pin mounted to said frame, said pivot bar being mounted to said caster pin.

22. An aerating lawn mower comprising a mower deck, wheels on said mower deck for movement of said mower across the ground, and at least one aerator assembly mounted to said mower deck for aerating the soil as said mower moves across the ground, said aerator assembly including a frame mounted to said mower deck, a pivot arm mounted to said frame for pivotal movement between a raised position and a lowered position, and a rotatable aerator wheel mounted to said pivot arm, said aerator wheel having a plurality of radial spikes for piercing and aerating the soil when said pivot arm is in its lowered position and said mower is moved across the ground.

23. An aerating lawn mower as claimed in claim 22 and wherein said pivot arm is yieldably spring biased toward its lowered position.

24. An aerating lawn mower as claimed in claim 23 and further comprising means for providing castered movement of said arm.

25. An aerating lawn mower as claimed in claim 22 and further comprising a gauge wheel mounted to said pivot arm for limiting the depth to which said spikes penetrate the soil.

* * * * *